United States Patent
Wagner et al.

[15] 3,672,286
[45] June 27, 1972

[54] DEVICE FOR ADJUSTMENT OF SHUTTERS AND DIAPHRAGMS IN PHOTOGRAPHIC APPARATUS

[72] Inventors: Karl Wagner, Ottobrunn; Helmut Durr, Munich, both of Germany

[73] Assignee: AGFA-Gevaert Aktiengesellschaft, Leverkusen, Germany

[22] Filed: Sept. 18, 1970

[21] Appl. No.: 73,352

[30] Foreign Application Priority Data

Sept. 19, 1969  Germany.....................P 19 47 428.3

[52] U.S. Cl..............................................95/64 C, 95/53 R
[51] Int. Cl..........................................................G03b 7/02
[58] Field of Search.........................................95/11 R, 64 C

[56] References Cited

UNITED STATES PATENTS

| | | | |
|---|---|---|---|
| 2,891,457 | 6/1959 | Schwahn | 95/64 |
| 2,994,258 | 8/1961 | Schafer et al. | 95/45 |
| 2,420,339 | 5/1947 | Rabinow | 95/36 |
| 3,107,593 | 10/1963 | Hausmann et al. | 95/11 |
| 3,443,498 | 5/1969 | Bihlmaier | 95/11 |
| 3,505,942 | 4/1970 | Ort | 95/64 |

*Primary Examiner*—Samuel S. Matthews
*Assistant Examiner*—Michael L. Gellner
*Attorney*—Michael S. Striker

[57] ABSTRACT

A photographic apparatus, particularly a still camera, wherein the upper right-hand corner portion of the front wall of the body supports a knob whose stem is confined to movements in a two-dimensional field. Vertical movements of the knob result in adjustments of the diaphragm, horizontal movements of the knob result in adjustments of the shutter, and movements of the knob in any other direction result in simultaneous adjustments of the shutter and diaphragm. The positions of the knob are observable in the view finder, and the knob can further rotate the moving coil instrument of an exposure meter so that the needle of the instrument moves with reference to stationary markers to indicate whether or not the selected combination of exposure time and aperture size is satisfactory for the planned exposure.

18 Claims, 2 Drawing Figures

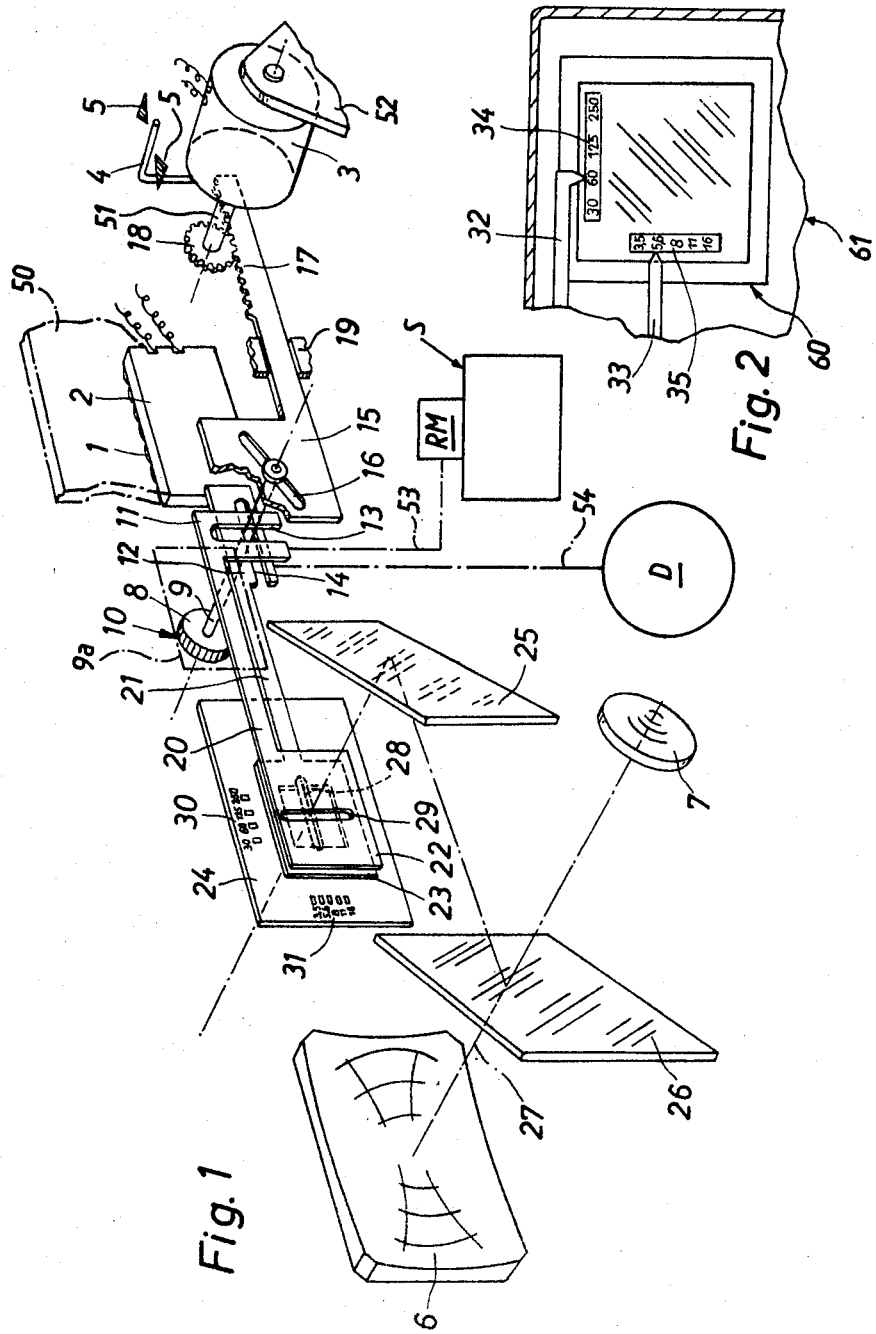

DEVICE FOR ADJUSTMENT OF SHUTTERS AND DIAPHRAGMS IN PHOTOGRAPHIC APPARATUS

BACKGROUND OF THE INVENTION

The present invention relates to photographic apparatus in general, and more particularly to improvements in photographic apparatus of the type embodying an adjustable shutter and an adjustable diaphragm.

Many presently known photographic apparatus are provided with separate adjusting devices for the shutter and diaphragm. It is also known to provide a photographic apparatus with a shutter which is coupled to the diaphragm in such a way that a change in the exposure time invariably entails a corresponding change in the aperture size or vice versa. Coupling of the shutter to the diaphragm in accordance with a predetermined exposure program is often undesirable because the user is unable to effect separate adjustments, for example, to produce special effects. As a rule, the adjusting device comprises one or more rings which are rotatable with reference to the lens mount about the optical axis of the picture taking objective. A drawback of such cameras is that the manipulation of one or more rings on the lens mount is rather difficult, not only because the user's hand is likely to move in front of the picture taking lens or view finder but also because the user cannot see the adjusted positions of such rings unless the camera is moved away from the picture taking position. Independent adjustments of the shutter and diaphragm can properly be made by advanced amateurs or professionals; however, a beginner is likely to make an unsatisfactory exposure if the camera is not provided with any means to indicate that the selection of such exposure values is proper for the next-following exposure.

SUMMARY OF THE INVENTION

An object of the invention is to provide a photographic apparatus with a novel and improved device for adjustment of the shutter and/or diaphragm.

Another object of the invention is to provide a photographic apparatus with a device which can adjust the shutter independently of the diaphragm or vice versa and which can also effect simultaneous adjustment of the shutter and diaphragm whereby the operator can read the selected positions of the shutter and diaphragm without taking his or her eye from the subject or scene.

A further object of the invention is to provide a photographic apparatus wherein the means for effecting appropriate adjustments of the shutter and/or diaphragm can be readily manipulated with one hand or with one or two fingers of a single hand while the operator continues to look at the subject or scene.

An additional object of the invention is to provide a simple, compact, long-lasting, reliable and accurate device for simultaneous and/or independent adjustment of shutters and diaphragms in still cameras and other types of photographic apparatus.

An ancillary object of the invention is to provide the photographic apparatus with novel means for indicating selected adjustments of the shutter and/or diaphragm in the view finder or at another point of the apparatus.

Still another object of the invention is to provide a photographic apparatus wherein the adjustments of the shutter and/or diaphragm automatically effect appropriate adjustments of the exposure meter assembly.

The invention is embodied in a photographic apparatus which comprises an adjustable shutter, an adjustable diaphragm, first adjusting means which is operative to adjust the shutter, second adjusting means which is operative to adjust the diaphragm, and actuating means which is movable in a two-dimensional field to thereby operate either or both of the adjusting means. For example, a vertical movement of the actuating means may effect an adjustment of the shutter, a horizontal movement of the actuating means may effect an adjustment of the diaphragm, and a movement of the actuating means in a direction other than a horizontal or a vertical direction then effects simultaneous adjustments of the shutter and the diaphragm. The actuating means is preferably mounted in such a way that it is accessible in front of the upper right-hand corner of the front wall of the body of the photographic apparatus. The means for confining the actuating means to movements in the two-dimensional field may include a plate which is movable in a flat compartment provided in or adjacent to the front wall.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a photographic apparatus which is provided with a device for simultaneous or separate adjustment of the shutter and diaphragm in accordance with one embodiment of the invention; and FIG. 2 is a fragmentary sectional view of a second camera which embodies a modified device.

DESCRIPTION OF THE PREFERRED EMBODIMENTS

FIG. 1 shows a portion of a still camera whose housing or body comprises a front wall 50 having a window which contains a raster 1 located in front of a photosensitive receiver 2. The receiver 2 forms part of an exposure meter assembly which further includes an adjustable light meter 3 (e.g., a galvanometer) in circuit with the receiver 2 so that the position of the output member or needle 4 of the light meter 3 is a function of scene brightness. The adjustment of the light meter 3 involves rotation of its casing about the axis of a shaft 51 which is mounted in brackets 52 (only one shown). The needle 4 is movable between and beyond two markers 5 which are provided in or on the housing of the camera; when the needle 4 is located between these markers, the adjustments of the camera shutter and diaphragm are proper for the making of an exposure. The adjustments of the needle 4 which are effected in response to rotation of the casing of the light meter 3 about the axis of the shaft 51 are superimposed upon such adjustments which are caused by the photosensitive receiver 2 as a function of scene brightness.

The view finder of the camera comprises an objective lens 6 which is mounted in the front wall 50 and an eyepiece 7 which is mounted in the rear wall of the housing. The actuating means 10 for simultaneous or selective adjustment of the shutter and diaphragm comprises a knob 8 which is accessible at the outer side of the front wall 50 (preferably in the region of the upper right-hand corner of the front wall) and a displacing member or stem 9 which is rigid with the knob and is movable by the latter in a two-dimensional field. Such field is located in or is parallel to the general plane of the front wall 50. It is preferred to provide the stem 9 with a plate 9a (indicated by phantom lines) which is confined to movement in the general plane of the front wall 50; the plate 9a is received in a flat compartment (not shown) of the front wall 50 so as to be movable in such compartment up, down, sideways as well as in a plurality of directions which are inclined with reference to a vertical or horizontal direction. The front wall 50 has a suitable aperture (not shown) which permits movements of the stem 9 and plate 9a in an infinite number of directions but always in such a way that the plate 9a remains in the plane of the aforementioned flat compartment. The plate 9a also serves to prevent entry of foreign matter by way of the aperture for the stem 9.

The actuating means 10 serves to move a first adjusting member 11 which is installed in the housing of the camera for reciprocatory movement in a horizontal direction to thereby adjust a shutter S. The exact design of the shutter S forms no part of the present invention; it preferably comprises a retard mechanism RM which is adjustable by the adjusting member 11 through the intermediary of a gear train 53 or another motion transmitting connection. The actuating means 10 further serves to move a second adjusting member 12 which is installed in the housing of the camera for reciprocatory movement in a vertical direction and can adjust a diaphragm D by way of a second gear train 54 or like motion transmitting means. The adjusting member 11 for the shutter S has a vertical slot 13 for the stem 9, and the adjusting member 12 for the diaphragm D has a horizontal slot 14 for the stem 9. The slots 13, 14 cross each other and the stem 9 extends through the intersection of these slots. Suitable ways or bearings (not shown) are provided to confine the adjusting member 11 to horizontal movement and to confine the adjusting member 12 to vertical movement with reference to the housing of the camera.

It will be seen that, when the user of the camera moves the knob 8 of the actuating means 10 in a direction to move the stem 9 sideways along the horizontal coordinate of the two-dimensional field, the position of the adjusting member 12 remains unchanged but the adjusting member 11 shares such movement of the stem 9 and effects an appropriate adjustment of the retard mechanism RM in the shutter S by way of the gear train 53. If the knob 8 is moved vertically, the stem 9 moves sideways along the vertical coordinate of the two-dimensional field and shifts the adjusting member 12 up or down while the position of the adjusting member 11 remains unchanged; this enables the adjusting member 12 to effect an appropriate adjustment of the diaphragm D by way of the gear train 54. If the knob 8 is moved in a direction other than a vertical or a horizontal direction, the stem 9 effects simultaneous movements of the adjusting members 11 and 12 so that the diaphragm D is adjusted simultaneously with the retard mechanism RM in the shutter S.

In order to insure that the adjustment of the shutter S is properly related to adjustment of the diaphragm D, the improved camera further comprises a motion transmitting connection between the stem 9 of the actuating means 10 and the light meter 3. This connection comprises a gear train including a pinion 18 on the shaft 51 and a rack 17 which meshes with the pinion 18 and is reciprocable in one or more bearings 19. The rack 17 has a plate-like extension 15 which is provided with an inclined slot 16 for the rearmost or innermost portion of the stem 9. Thus, the stem 9 can change the angular position of the casing of the light meter 3 (and hence the position of the needle 4 with reference to the markers 5) when the knob 8 is moved to change the position of the adjusting member 11 and/or 12.

The exposure time is selected prior to an exposure by moving the knob 8 and the stem 9 of the actuating means 10 along the horizontal coordinate of the two-dimensional field. If the selected exposure time is such that the needle 4 is not located between the markers 5, the user of the camera moves the knob 8 and the stem 9 along the vertical coordinate of the two-dimensional field so as to change the aperture size without changing the exposure time. Such movement of the stem 9 causes the extension 15 to shift the rack 17 with reference to the bearing 19 whereby the pinion 18 turns in a clockwise or in a counterclockwise direction to change the position of the needle 4. The adjustment is completed when the needle 4 is located between the markers 5. It is clear that the just described procedure can be reversed, i.e., the knob 8 can be moved first along the vertical coordinate of the two-dimensional field to select a desired aperture size and, if the needle 4 is not located between the markers 5, the knob 8 is thereupon moved horizontally to change the position of the adjusting member 11 and to again change the position of the rack 17 until the needle 4 reaches a desired position with reference to the markers 5.

The position of the needle 4 remains unchanged if the stem 9 is moved in the longitudinal direction of the inclined slot 16 in the extension 15; the aperture size then changes with the exposure time in such a way that the user can make a proper exposure in response to any combination of exposure time and aperture size as long as the needle 4 remains between the markers 5. Thus, the exposure values (aperture size and exposure time) can be changed simultaneously from exposure stage to exposure stage without necessitating any adjustment in the angular position of the light meter 3.

As stated before, the knob 8 is preferably located in front of the upper right-hand corner portion of the front wall 50. This enables the user to readily manipulate the actuating means 10 without removing his or her eye from the subject or scene. The manipulation of the knob 8 is further facilitated by the provision of suitable indicating means which enables the user to read the selected exposure time and aperture size in the view finder. The indicating means of the camera shown in FIG. 1 is designed to produce a light spot which is reflected into the view finder by two suitably positioned mirrors 25 and 26. The front wall 50 of the camera housing has a window for a dial plate or pane 24 provided with a horizontal scale 30 which is graduated to show various exposure times and a vertical scale 31 which is graduated to show various aperture sizes (f/stops). The adjusting member 11 has an arm 20 which carries at its free end a first opaque mask 22 located behind the dial plate 24 and having a vertical slot 29. The adjusting member 12 has an arm 21 which also carries an opaque mask 23 located in front of the mask 22 and provided with a horizontal slot 28. The intersection of the slots 28, 29 admits the aforementioned light spot against the mirror 25 which reflects the spot against the mirror 26; the latter reflects the light spot into the eye of the person looking through the eyepiece 7. The mirrors 25, 26 further reflect the images of the scales 30 and 31 whereby the user can see the position of the light spot with reference to the images of the two scales and can read the selected combination of exposure time and aperture size. If desired, the dial plate 24 can be illuminated to insure that the light spot passing through the intersection of the slots 28, 29 can be readily discerned in the view finder. The scales 30 and 31 are respectively parallel with the horizontal and vertical coordinates of the two-dimensional field for the actuating means 10. The numeral 27 denotes the beam of light which enters the view finder.

FIG. 2 illustrates a portion of a slightly modified camera. The view finder 60 of this camera is installed in the housing or body 61 and the adjusting members 11, 12 (not shown) are directly or indirectly connected to or provided with pointers 32, 33 whose tips extend into the view finder 60 and are movable along scales 34, 35, respectively. The scale 34 is graduated to indicate various exposure times and the graduations of the scale 35 indicate various aperture sizes.

It is clear that the improved photographic apparatus is susceptible of many additional modifications without departing from the spirit of the present invention. For example, the arms 20, 21 can be used to directly adjust the shutter and the diaphragm, and the adjusting members 11, 12 need not be mounted for movement at an angle of 90° with reference to each other. Still further, the masks 22, 23 or the pointers 32, 33 need not derive motion directly from the respective adjusting members 11, 12; such parts can be adjusted by the shutter and diaphragm so that they invariably assume positions which are indicative of the selected exposure time and aperture size. Moreover, the camera may be provided with other types of indicating means which may but need not be mounted to indicate the exposure time and the aperture size in the view finder. The functions of the adjusting members 11, 12 can be changed, i.e., the member 11 can adjust the diaphragm D and the member 12 then adjusts the retard mechanism RM. This would involve appropriate changes in the positions of the scales 30, 31 or 34, 35.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising an adjustable shutter; an adjustable diaphragm; first adjusting means operative to adjust said shutter; second adjusting means operative to adjust said diaphragm; and actuating means operatively connected to said first and second adjusting means and being movable in a two-dimensional field whereby a movement of said actuating means in at least one first direction will result in operation of said first adjusting means, a movement of said actuating means in at least one second direction will result in operation of said second adjusting means and a movement of said actuating means in at least one third direction will result in simultaneous operation of said first and second adjusting means.

2. A combination as defined in claim 1, further comprising exposure meter means including an adjustable measuring instrument, and motion transmitting means for adjusting said instrument in response to operation of at least one of said first and second adjusting means.

3. A combination as defined in claim 2, wherein said motion transmitting means is operatively connected with said actuating means and said light measuring instrument is a moving coil instrument.

4. A combination as defined in claim 3, wherein said motion transmitting means comprises a gear train.

5. A combination as defined in claim 1, wherein said field has two coordinates and said actuating means is movable in a plurality of directions including a movement along one of said coordinates to thereby operate only said first adjusting means and a movement along the other coordinate to thereby operate only said second adjusting means.

6. A combination as defined in claim 1, further comprising a view finder and indicating means for indicating the position of said actuating means in said view finder.

7. A combination as defined in claim 6, wherein said indicating means includes means for producing a light spot which moves in said view finder in synchronism with said actuating means.

8. A combination as defined in claim 7, wherein said indicating means further comprises scale means defining a coordinate system with exposure times measured along one of the coordinates and the aperture sizes measured along the other coordinate, said coordinate system being observable in said view finder and said light spot being movable with reference to said coordinates to indicate the exposure time and the aperture size as a function of the position of said actuating means in said field.

9. A combination as defined in claim 7, wherein said means for producing said light spot comprises a first mask receiving motion from said actuating means and having a first elongated slot, a second mask receiving motion from said actuating means and having a second elongated slot crossing said first slot so that light can pass only through the intersection of said slots, and means for reflecting into said view finder the light passing through said intersection.

10. A combination as defined in claim 9, wherein said first mask receives motion by way of said first adjusting means and said second mask receives motion by way of said second adjusting means.

11. A combination as defined in claim 1, further comprising view finder means and first and second pointer means respectively connected with said first and second adjusting means and having portions observable in said view finder means to respectively indicate the selected exposure time and aperture size.

12. A combination as defined in claim 11, further comprising an exposure time scale observable in said view finder means adjacent to said portion of said first pointer means and an aperture scale observable in said view finder means adjacent to said portion of said second pointer means.

13. In a photographic apparatus, a combination comprising an adjustable shutter; an adjustable diaphragm; first adjusting means operative to adjust said shutter and having a first elongated slot; second adjusting means operative to adjust said diaphragm and having a second elongated slot which crosses said first slot, said first and second adjusting means being respectively movable substantially transversely of said first and second slots; and actuating means movable in a two-dimensional field to thereby operate either or both of said adjusting means, said actuating means comprising a displacing portion extending through the intersection of said slots and being movable in a plurality of directions including a movement lengthwise of said first slot to thereby move said second adjusting means and a movement lengthwise of said second slot to thereby move said first adjusting means.

14. A combination as defined in claim 13, wherein said shutter comprises an adjustable retard mechanism connected with said first adjusting means to undergo adjustment in response to movement of said first adjusting means.

15. A combination as defined in claim 14, further comprising a gear train for transmitting motion from said first adjusting means to said retard mechanism.

16. A combination as defined in claim 13, wherein said diaphragm comprises an adjustable element connected with said second adjusting means to undergo adjustment in response to movement of said second adjusting means.

17. A combination as defined in claim 16, further comprising a gear train for transmitting motion from said second adjusting means to said element.

18. A combination as defined in claim 13, further comprising an exposure meter having an adjustable light measuring instrument and motion transmitting means for adjusting said instrument, said motion transmitting means comprising a motion transmitting member having a third slot which is inclined with reference to and crosses said first and second slots, said displacing portion extending into said third slot to adjust said instrument by way of said motion transmitting means when said displacing portion is caused to move in a direction other than lengthwise of said third slot.

* * * * *